G. GILOOLEY.
SCREW HEAD GUARD.
APPLICATION FILED JUNE 22, 1914.
1,160,877.
Patented Nov. 16, 1915.
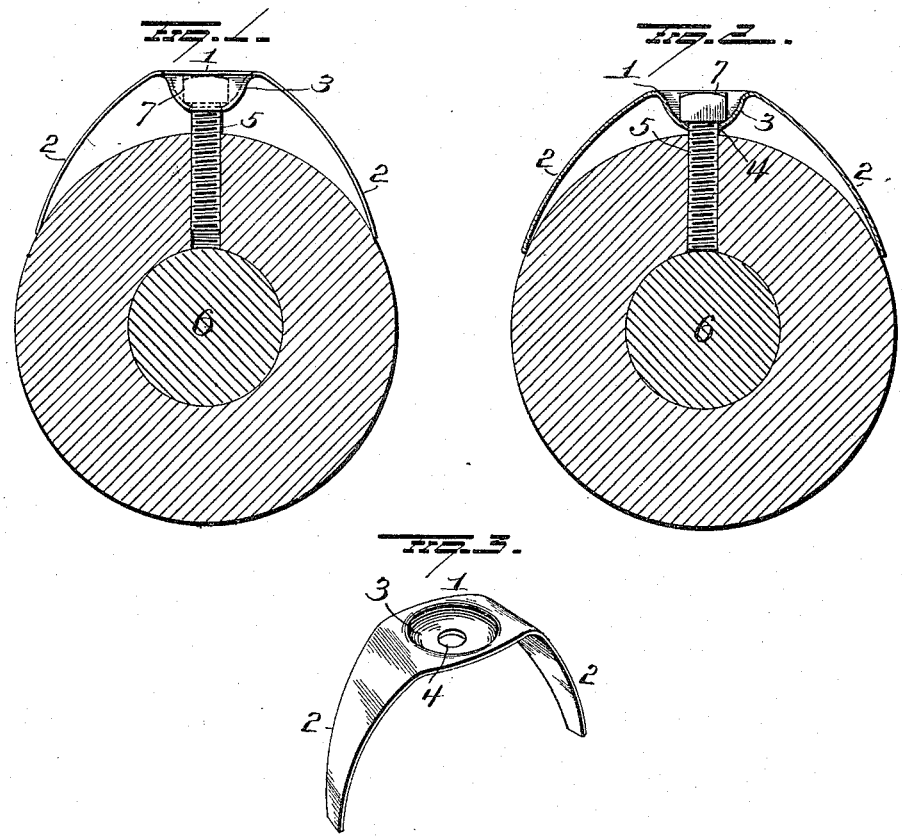

UNITED STATES PATENT OFFICE.

GEORGE GILOOLEY, OF LOCKPORT, NEW YORK.

SCREW-HEAD GUARD.

1,160,877.

Specification of Letters Patent.

Patented Nov. 16, 1915.

Application filed June 22, 1914. Serial No. 846,660.

*To all whom it may concern:*

Be it known that I, GEORGE GILOOLEY, of Lockport, in the county of Niagara and State of New York, have invented certain new and useful Improvements in Screw-Head Guards; and I do hereby declare the following to be a full, clear, and exact description of the invention, such as will enable others skilled in the art to which it appertains to make and use the same.

This invention relates to improvements in guards for screw heads and more particularly to such as are adapted for use for protecting the heads of screws for pulleys, collars and the like, one object of the invention being to so construct a guard of the character specified that it may be cheaply and quickly manufactured and which may be easily applied.

A further object is to so construct the guard that it will adequately protect the head of the screw and at the same time permit ready access to said head with a wrench.

A further object is to so construct the guard that it may be secured in place by the head of the screw and so that the pressure of said head shall apply such tension to the wings of the guard as to cause said wings to properly hug the hub of the pulley, the tension to which the guard is thus subjected also serving to assist in preventing the loosening of the screw while the pulley is in operation.

With these and other objects in view, the invention consists in certain novel features of construction as hereinafter set forth and pointed out in the claims.

In the accompanying drawings, Figures 1 and 2 are sectional views illustrating an embodiment of my invention; and Fig. 3 is a separate view of the guard.

The guard is constructed of thin resilient metal, and comprises in a single piece of sheet metal, a body portion 1 and curved tapering wings 2, 2, the latter being adapted to hug the hub of the pulley or the collar to which the guard is applied.

The body portion 1 of the guard is made with a partly spherical open recess or depression 3 which may be conveniently formed by stamping, and centrally in the bottom of said recess or depression, a hole 4 is made for the passage of the screw 5 which serves to secure the pulley or collar to its shaft 6.

The dished recess or depression 3 of the guard serves to receive and house the head 7 of the screw 5, protecting said head from conflict with other objects. The head of the screw also serves to secure the guard in place on the pulley hub or collar, and the wall of the recess or depression being curved, the pressure of the head of the screw upon said curved wall (at diametrically opposite points if the head be angular) will cause such tension to be applied to the device as to insure the close hugging of the wings to the hub. Furthermore, by thus subjecting the resilient device to the pressure of the screw head, outward pressure will be exerted against the under face of said head sufficient to so increase the frictional engagement between the screw head and the guard as to prevent the loosening of the screw when the pulley is in operation.

It will be observed that in both forms of the invention, the recess or depression in which the head of the screw is housed, is open so that it is readily accessible with a wrench and that the guard is held in place by the head of the screw with such tension that it will prevent the accidental loosening of the screw.

Having fully described my invention what I claim as new and desire to secure by Letters-Patent, is:—

1. A guard of the character described, comprising a single piece of resilient sheet metal bent to form a central body portion and segmental arms approximately equal in length and disposed at obtuse angles to and at respective sides of said central body portion, said central body portion having a hemispherical depression to receive and surround the head of a bolt, and said body portion having a hole in the bottom of said depression for the pasasge of said bolt, the curved bottom of said depression engaging edge portions of the bolt head.

2. A guard of the character described comprising a single piece of resilient sheet metal bent to form a central body portion and curved tapering arms at respective sides thereof, said central body portion bent to form a hemispherical depression constituting a housing to completely surround a bolt head, said central portion having a central hole in the bottom of said depression, the curved bottom of said depression engaging edge portions of the bolt head.

In testimony whereof, I have signed this specification in the presence of two subscribing witnesses.

GEORGE GILOOLEY.

Witnesses:
THOMAS H. CARTER,
GEO. HARDIMAN.

Copies of this patent may be obtained for five cents each, by addressing the "Commissioner of Patents, Washington, D. C."